(12) United States Patent
Chilukuri

(10) Patent No.: US 11,078,871 B2
(45) Date of Patent: Aug. 3, 2021

(54) THRUST REVERSER SYSTEM WITH CASCADES

(71) Applicant: Rohr, Inc., Chula Vista, CA (US)

(72) Inventor: Radhakrishna Chilukuri, San Diego, CA (US)

(73) Assignee: Rohr, Inc., Chula Vista, CA (US)

(*) Notice: Subject to any disclaimer, the term of this patent is extended or adjusted under 35 U.S.C. 154(b) by 101 days.

(21) Appl. No.: 16/230,133

(22) Filed: Dec. 21, 2018

(65) Prior Publication Data
US 2020/0200124 A1 Jun. 25, 2020

(51) Int. Cl.
*F02K 1/72* (2006.01)
*F02K 1/76* (2006.01)

(52) U.S. Cl.
CPC .......... *F02K 1/72* (2013.01); *F02K 1/766* (2013.01); *F05D 2240/129* (2013.01)

(58) Field of Classification Search
CPC ..... F02K 1/70; F02K 1/72; F02K 1/62; F02K 1/625; F05D 2240/129
See application file for complete search history.

(56) References Cited

U.S. PATENT DOCUMENTS

| | | | |
|---|---|---|---|
| 3,779,010 A | 12/1973 | Chamay | |
| 4,183,478 A | 1/1980 | Rudolph | |
| 5,507,143 A * | 4/1996 | Luttgeharm | F02K 1/563 239/265.31 |
| 5,706,649 A * | 1/1998 | Robinson | F02K 1/008 239/265.13 |
| 9,587,582 B1 | 3/2017 | Schaefer | |
| 9,719,466 B2 | 8/2017 | Nakhjavani | |
| 2008/0010969 A1* | 1/2008 | Hauer | F02K 1/72 60/204 |
| 2013/0025259 A1 | 1/2013 | Beardsley | |
| 2016/0076487 A1* | 3/2016 | Nakhjavani | F02K 1/60 239/265.19 |
| 2017/0009704 A1 | 1/2017 | Dong | |
| 2017/0058829 A1 | 3/2017 | Dong | |
| 2017/0292473 A1* | 10/2017 | Stretton | F02K 1/763 |
| 2018/0340492 A1* | 11/2018 | Harpal | F02K 1/72 |

OTHER PUBLICATIONS

EP search report for EP19220230.7 dated May 11, 2020.

* cited by examiner

*Primary Examiner* — Andrew H Nguyen
(74) *Attorney, Agent, or Firm* — Getz Balich LLC (57) ABSTRACT

A cascade box is provided that includes a plurality of lengthwise extending side turning vanes and a plurality of forward turning vanes. Each of the plurality of lengthwise extending side turning vanes is configured to have a side turning angle. Each of the plurality of forward turning vanes is attached to respective adjacent ones of the plurality of side turning vanes, and each forward turning vane is configured to have a forward turning angle, and at least one of the forward turning vanes is configured to have a negative forward turning angle.

7 Claims, 7 Drawing Sheets

| CASCADE No. | Forward Turning Angle ("FTA") | Side Turning Angle ("STA") | Side Turning Angle Hand |
|---|---|---|---|
| C1 | Positive FTA | Zero STA | — — |
| C2 | Positive FTA | Zero STA | — — |
| C3 | Positive FTA | Positive STA | Right |
| C4 | Positive FTA | Positive STA | Left |
| C5 | Positive FTA | Zero STA | — — |
| C6 | Positive FTA | Zero STA | — — |
| C7 | Zero/Positive FTA | Positive STA | Right |
| C8 | Negative FTA | Positive STA | Right |
| C9 | Negative FTA | Positive STA | Left |
| C10 | Negative/Positive FTA | Positive STA | Left |
| C11 | Positive FTA | Zero STA | — — |
| C12 | Positive FTA | Zero STA | — — |
| C13 | Positive FTA | Positive STA | Left |
| C14 | Positive FTA | Positive STA | Left |
| C15 | Positive FTA | Zero STA | — — |
| C16 | Positive FTA | Zero STA | — — |

THRUST REVERSER SYSTEM WITH CASCADES

BACKGROUND OF THE INVENTION

1. Technical Field

The present disclosure relates to thrust reversers for aircraft propulsion systems and, more particularly, to thrust reverser cascades and thrust reverser cascade arrangements.

2. Background Information

Turbofan gas turbine engines are known to include a fan section that produces a bypass airflow for providing engine thrust and a core gas path where air is ingested, compressed in a compressor section, and mixed with fuel and combusted within a combustor section. The core gas and combustion products provide the energy that powers a turbine section and provides additional thrust. In aircraft applications, the engine gas turbine engine includes a nacelle that surrounds the core of the engine and provides an annular duct for the bypass airflow, directing the bypass airflow in an aft direction to produce the forward thrust. In some applications, a nacelle may include a thrust reverser system capable of redirecting at least a portion of the bypass airflow from the aft direction at least partially to a forward direction thus producing a rearward or "reverse" thrust. In some thrust reverser systems, a portion of the nacelle (e.g., a "nacelle sleeve") is translatable between a first position and a second position. In the first position (i.e., a thrust reverser non-actuated configuration), the nacelle sleeve covers a plurality of cascade boxes disposed circumferentially around the bypass airflow duct. In the first position, the bypass airflow travels through the annular bypass airflow duct and exits aft of the engine. In the second position (i.e., a thrust reverser actuated configuration), the nacelle sleeve is translated to a position where it no longer completely covers a plurality of cascade boxes disposed circumferentially around the bypass airflow duct. When the nacelle sleeve is translated to a position where it no longer completely covers the cascade boxes, a plurality of blocker doors are actuated into the annular bypass airflow duct aft of the cascade boxes, thereby blocking at least a portion of the annular bypass airflow duct. In the second position, at least a portion of the bypass airflow traveling through the annular bypass airflow duct is redirected to exit through flow passages within the cascade boxes. At least some of the cascade boxes are configured to turn the bypass airflow to produce reverse thrust. An important design aspect of cascade boxes involves the possibility that bypass air exiting the thrust reverser system will be reingested repeatedly into the gas turbine air. Bypass air is typically at a substantially elevated temperature relative to ambient air. Reingested bypass air can generate pressure and/or temperature distortion levels within the gas turbine engine inlet. It is, therefore, desirable to avoid any significant reingestion of bypass airflow.

A thrust reverser system by its nature must consider the operational parameters of the gas turbine engine with which it is utilized. For example, turbofan gas turbine engines are designed to operate within a bypass air pressure ratio range during normal operation; i.e., operating conditions when the thrust reverser system is not deployed. When a thrust reverser system is deployed, the "normal" bypass air pressure ratio range should be substantially maintained for continued proper engine operation. To maintain the bypass air ratio range, it is known to configure the thrust reverser system to produce a thrust reverser air flow that, when combined with the bypass air that is not blocked within the duct (i.e., the flow that continues aft and produces forward thrust), substantially matches the bypass air pressure ratio range under "normal" conditions. This design balance between thrust reverser system deployed and thrust reverser system stowed is often referred to as "area matching". To achieve "area match", not only the flow area of the thrust reverser system, but also its implication to reverse thrust must be considered. For example, cascade vanes having substantial forward turning angles are desirable for creating reverse thrust (and therefore thrust reverser system "effectiveness"), but they also substantially pinch the available reverse thrust area, resulting in a requirement to increase cascade boxes length, and concomitantly increase weight. Historically, competing parameters like these have limited the amount of reverse thrust that could be produced by a thrust reverser system.

A thrust reverser system is typically used once an aircraft has touched ground, but is still moving. The reverse thrust produced by the thrust reverser system provides a braking force that assists in slowing the aircraft to a safe speed, and thereby avoids the need to rely completely on the braking system of the landing gear. It is estimated that using prior art thrust reverser systems, the potential for bypass reingestion increases once the aircraft has slowed to a speed of about 60 knots (i.e., a "cutoff" speed of 60 knots). To avoid potentially detrimental reingestion, therefore, prior art aircraft systems may disengage a thrust reverser system once the aircraft has slowed to a speed of about 60 knots. Braking of the aircraft thereafter is reliant upon the landing gear braking system.

What is needed, therefore, is a thrust reverser system cascade boxes that permits the system to produce greater amounts of reverse thrust with a decreased amount of undesirable reingestion at airspeeds lower than 60 knots, and one that can be used in a retrofit application. Such a thrust reversing system may also be useful for aircraft back-up from an airport gate, a situation where the airspeed is zero, and very useful in airport operations.

SUMMARY OF THE INVENTION

According to an aspect of the present disclosure, a cascade box is provided that includes a plurality of lengthwise extending side turning vanes and a plurality of forward turning vanes. Each of the plurality of lengthwise extending side turning vanes is configured to have a side turning angle. Each of the plurality of forward turning vanes is attached to respective adjacent ones of the plurality of side turning vanes, and each forward turning vane is configured to have a forward turning angle, and at least one of the forward turning vanes is configured to have a negative forward turning angle.

In any of the aspects or embodiments described above and herein, the cascade box is arranged to have a plurality of lengthwise columns, wherein each forward turning vane in a respective one of the lengthwise columns may have the same said forward turning angle as the other forward turning vanes in the respective lengthwise column.

In any of the aspects or embodiments described above and herein, the plurality of lengthwise extending columns may include a first column with all the forward turning vanes within the first column configured to have a first forward turning angle, and a second column with all the forward turning vanes within the second column configured to have a second forward turning angle, wherein the first forward turning angle is greater than the second forward turning angle.

In any of the aspects or embodiments described above and herein, the first forward turning angle may be a positive forward turning angle, and the second forward turning angle may be a negative forward turning angle.

In any of the aspects or embodiments described above and herein, the first forward turning angle and the second forward turning angles may both be positive forward turning angles.

In any of the aspects or embodiments described above and herein, all of the forward turning vanes within the cascade box may be configured to have a negative forward turning angle.

In any of the aspects or embodiments described above and herein, the cascade box may extend lengthwise between a leading end and a trailing end, and widthwise between a first lateral side and a second lateral side opposite the first lateral side, and the cascade box may be arranged to have a plurality of columns extending lengthwise between the leading end and the trailing end, wherein each forward turning vane in a respective one of the lengthwise columns may have the same said forward turning angle as the other vanes in the respective lengthwise column.

In any of the aspects or embodiments described above and herein, each side turning vane on a respective side of one of the lengthwise columns may have the same said side turning angle as the other side turning vanes on the respective side of the respective lengthwise column.

In any of the aspects or embodiments described above and herein, the plurality of lengthwise extending columns may include a first column with all the forward turning vanes within the first column configured to have a first forward turning angle, and a second column with all the forward turning vanes within the second column configured to have a second forward turning angle, wherein the first forward turning angle is greater than the second forward turning angle.

In any of the aspects or embodiments described above and herein, the cascade box may be arranged to have a plurality of lengthwise columns, wherein each side turning vane on a respective side of a respective one of the lengthwise columns may have the same said side turning angle as the other side turning vanes on the respective side of the respective lengthwise column.

In any of the aspects or embodiments described above and herein, the plurality of lengthwise extending columns may include a first column with all the side turning vanes on a respective side of the first column configured to have a first side turning angle, and a second column with all the side turning vanes on a respective side of the second column configured to have a second side turning angle, wherein the first side turning angle is greater than the second side turning angle.

In any of the aspects or embodiments described above and herein, both the first side turning angle and the second side turning angle are left hand side turning angles, or both the first side turning angle and the second side turning angle are right hand side turning angles.

According to an aspect of the present disclosure, a nacelle is provided that includes a plurality of cascade boxes arranged circumferentially around the nacelle. Each cascade box includes a plurality of lengthwise extending side turning vanes, each configured to have a side turning angle, and a plurality of forward turning vanes attached to respective adjacent ones of the plurality of side turning vanes, wherein each forward turning vane is configured to have a forward turning angle, and at least one of the forward turning vanes is configured to have a negative forward turning angle.

In any of the aspects or embodiments described above and herein, each cascade box may be arranged to have a plurality of lengthwise columns, including a first column with all the forward turning vanes within the first column configured to have a first forward turning angle, and a second column with all the forward turning vanes within the second column configured to have a second forward turning angle, wherein the first forward turning angle is greater than the second forward turning angle.

In any of the aspects or embodiments described above and herein, the plurality of cascade boxes includes a first cascade box, the first cascade box arranged to have a plurality of lengthwise columns, including a first column with all the side turning vanes on a respective side of the first column configured to have a first side turning angle, and a second column with all the side turning vanes on a respective side of the second column configured to have a second side turning angle, wherein the first side turning angle is greater than the second side turning angle.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

In various embodiments and with reference to FIGS. 1-4, an aircraft 20 may comprise a fuselage 22 and a pair of wings 24. A propulsion system 26 (e.g., a turbofan gas turbine engine with a nacelle assembly) may be coupled to the aircraft 20 (e.g., mounted on the underside of a wing 24). The propulsion system 26 may be configured to provide at least one of forward thrust or propulsion for aircraft 20.

Figure 1:
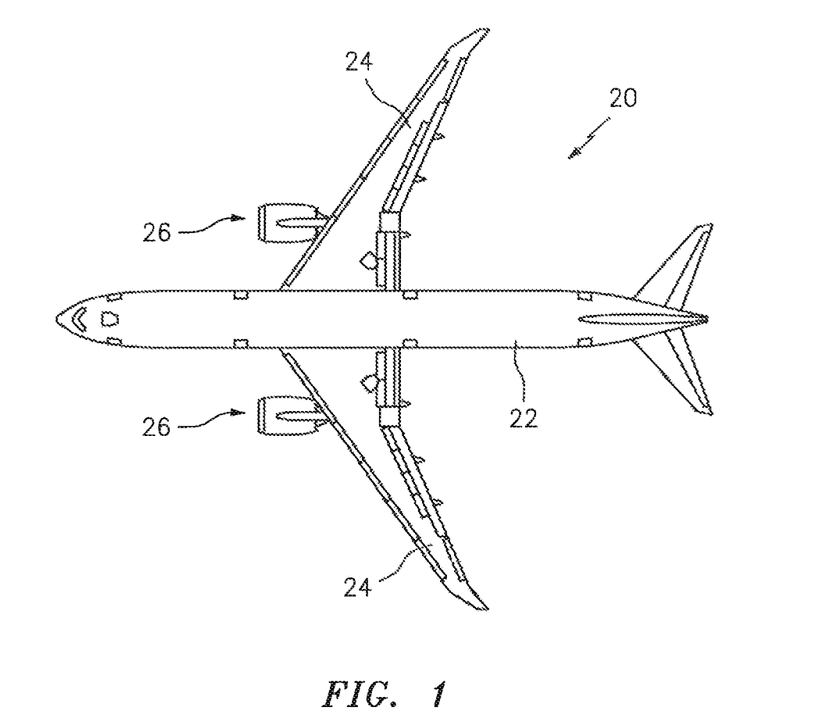
FIG. 1 illustrates a perspective view of an aircraft.
Figure 2:
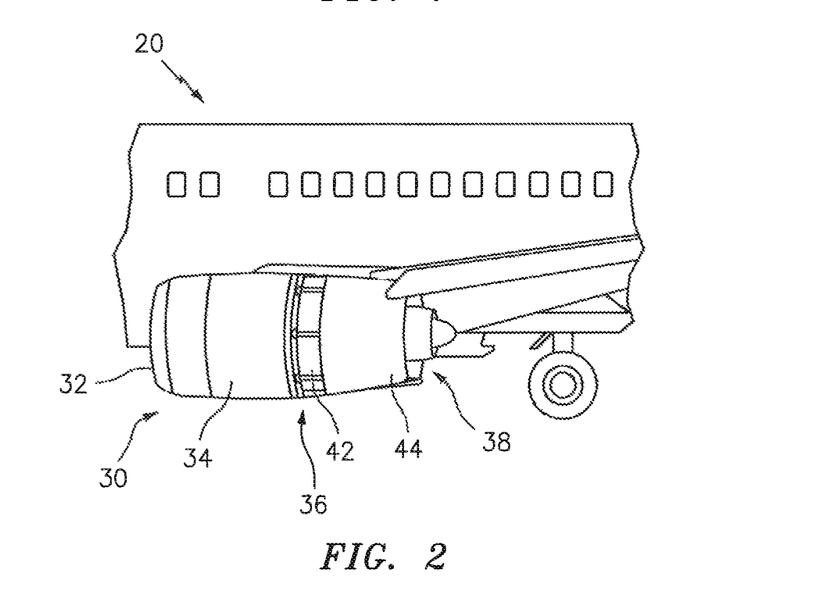
FIG. 2 illustrates a partial side view of an aircraft with a propulsion system affixed to a wing.
Figure 3:
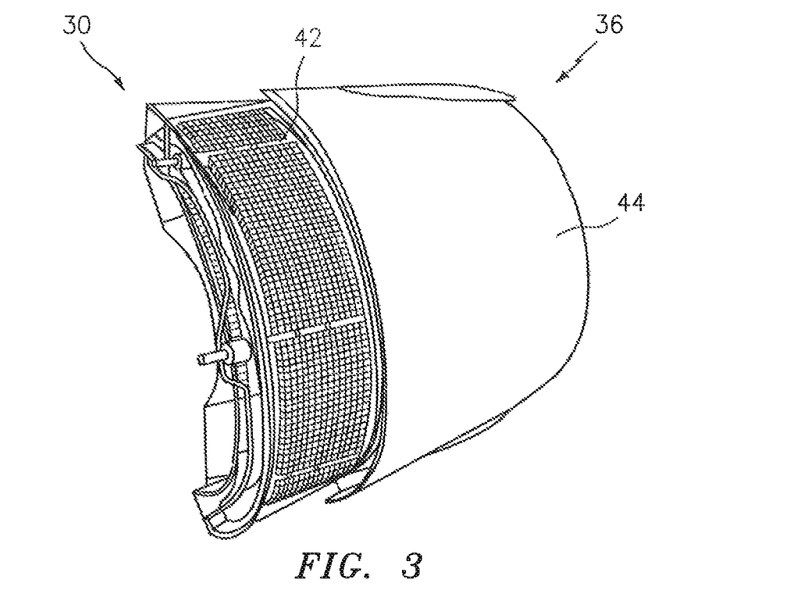
FIG. 3 illustrates a partial side view of a nacelle with a thrust reverser system.

In various embodiments, the propulsion system 26 may comprise an engine including an engine core housed within a nacelle assembly 30. The typical nacelle assembly 30 ("nacelle 30"), may comprise an inlet 32, a fan cowl 34, and a thrust reverser system 36, and an exhaust system 38, the exhaust system 38 disposed at or adjacent the aft portion 39 of the nacelle 30. The nacelle 30 surrounds the engine core providing smooth aerodynamic surfaces for airflow around and into the engine. The nacelle 30 also helps define a bypass airflow duct through the propulsion system 26.

In various embodiments, a fan section draws a flow of air into and through the propulsion system 26. Aft of the fan section, the air is divided into two principal flow paths, one flow path through engine core (i.e., a "core airflow"), and another flow path through a bypass air duct 40 (i.e., a "bypass airflow"). The engine core flow path is directed into a compressor section that increases the air flow pressure, and then through a combustor section where at least a portion of the core airflow air is mixed with fuel and ignited. The core airflow (now including combustion products) exiting the combustor section powers a turbine section. The turbine section in turn provides motive force to engine's compressor section and fan section. The core airflow exits the turbine section through an exhaust system 38 aft of the engine and produces thrust.

Figure 4:
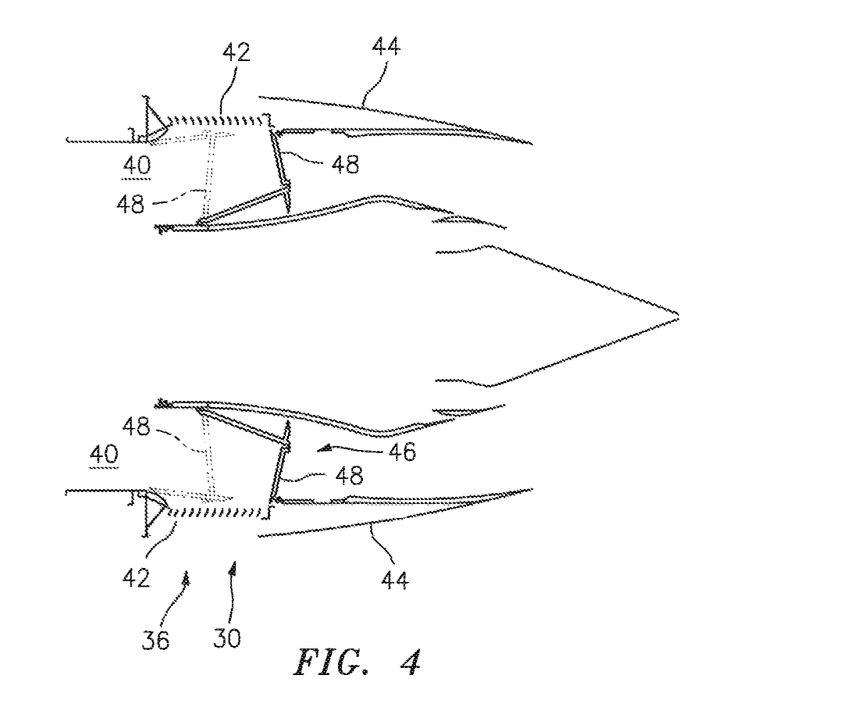
FIG. 4 is a diagrammatic sectional view of a nacelle.
Figure 5:
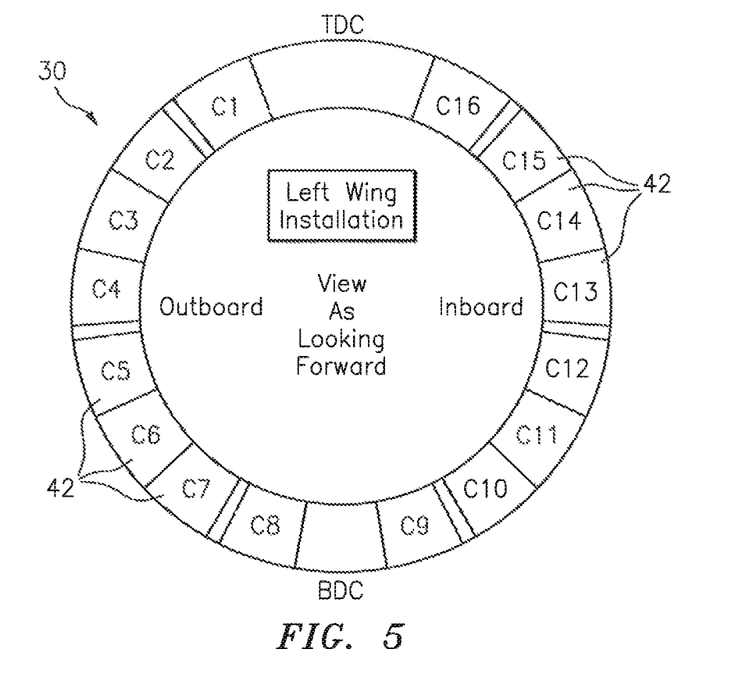
FIG. 5 is a diagrammatic representation of a nacelle.

Referring to FIGS. 3 and 4, a thrust reverser system 36 may include a plurality of cascade boxes 42 disposed around at least a portion of the nacelle 30 circumference. As a non-limiting example, the thrust reverser system 36 may include one or more translating sleeves 44 and an air diverter system 46 (e.g., blocker doors 48, diversion doors, etc.). The air diverter system 46 is configured to at least partially block the bypass air duct 40. The one or more translating sleeves 44 may be controlled to translate aft, away from a fan cowl 34, into an open position, and may also be controlled to translate forward toward the fan cowl 34 into a closed position. The actuation of the air diverter system 46 is coordinated with the sleeve 44 translation; e.g., in the sleeve open position the air diverter system 46 deploys blocker doors 48 (or similar structure) into the bypass air duct 40, and the air diverter system 46 stows the blocker doors 48 out of the bypass air duct 40 in the closed position. FIG. 4 diagrammatically shows blocker doors 48 in a deployed configuration, and shows the same blocker doors 48 in a stowed configuration in phantom lines. When the sleeve 44 is disposed in the open position and the blocker doors 48 (or similar structure) are deployed in the bypass air duct 40, at least a portion of the bypass air is diverted through the cascade boxes 42. FIG. 5 diagrammatically illustrates a forward view from the aft of a nacelle 30, depicting a plurality of cascade boxes 42 disposed around the circumference of the nacelle 30. In this exemplary diagram, the plurality of cascade boxes 42 is shown as having sixteen (16) cascade boxes 42. The present disclosure is not limited to a thrust reverser system 36 having any particular number of circumferentially disposed cascade boxes 42, and therefore is not limited to one having sixteen (16) cascade boxes 42.

Figure 6:
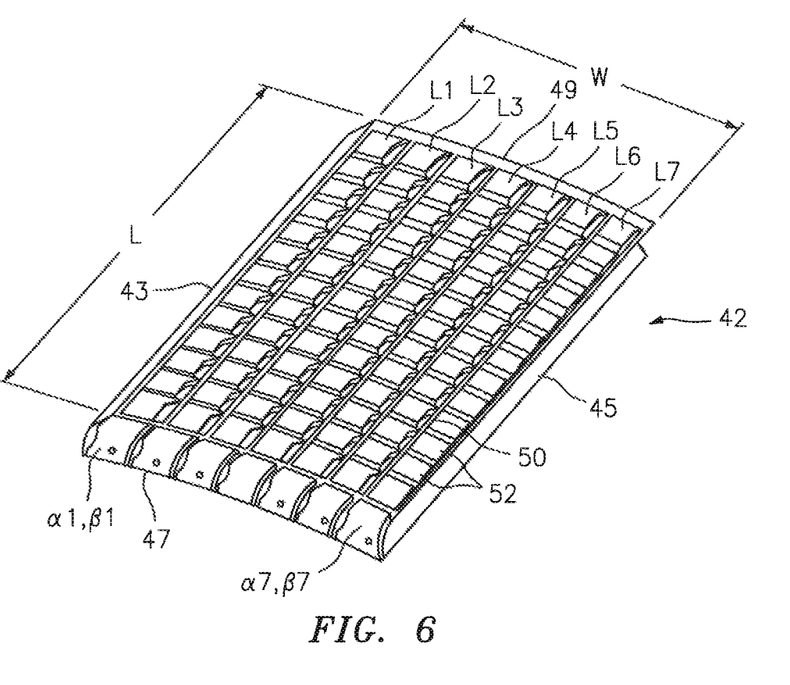
FIG. 6 is a diagrammatic view of a cascade embodiment.
Figure 6A:
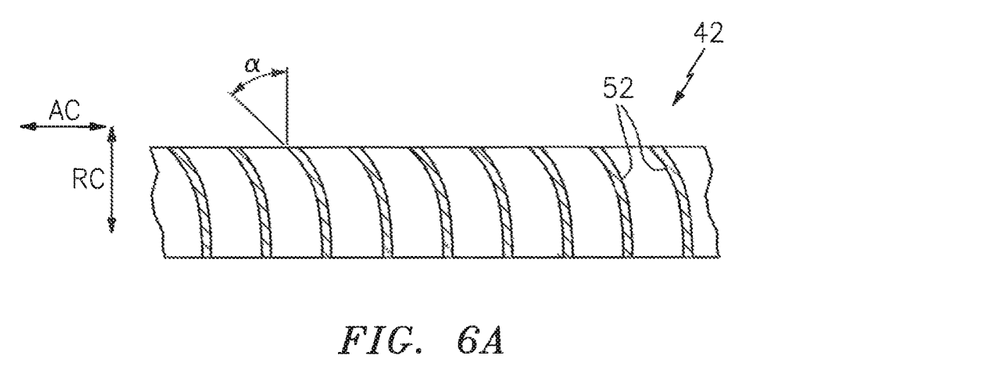
FIG. 6A is a diagrammatic partial lengthwise sectional view of a cascade embodiment.

Referring to FIGS. 6 and 6A, each cascade box 42 may be described as having a width ("W") extending between a first lateral side 43 and a second lateral side 45, and a length ("L") extending between a leading end 47 and a trailing end 49. Each cascade box 42 typically includes a plurality of side turning vanes 50 and forward turning vanes 52 disposed between adjacent side turning vanes 50. The side turning vanes 50 extend lengthwise within the cascade 42. The forward turning vanes 52 extend between adjacent pairs of side turning vanes 50, and are spaced apart from one another. A cascade box 42 may be described as having lengthwise extending columns (referred to as "ladders"), with each ladder defined by a column of forward turning vanes 52 disposed between adjacent rows of side turning vanes 50. Each cascade box 42 may be described as having an inlet side and an exit side. When the cascade box 42 is mounted within the nacelle 30, the inlet side is disposed radially inside of the exit side; i.e., during thrust reverser operation, bypass air enters the cascade box 42 through the inlet side and exist the cascade box 42 through the exit side.

The cascade boxes 42 may be formed of a variety of materials (e.g., a carbon-epoxy composite, fiber reinforced materials, etc.), and are not therefore limited to any particular material.

Figure 7:
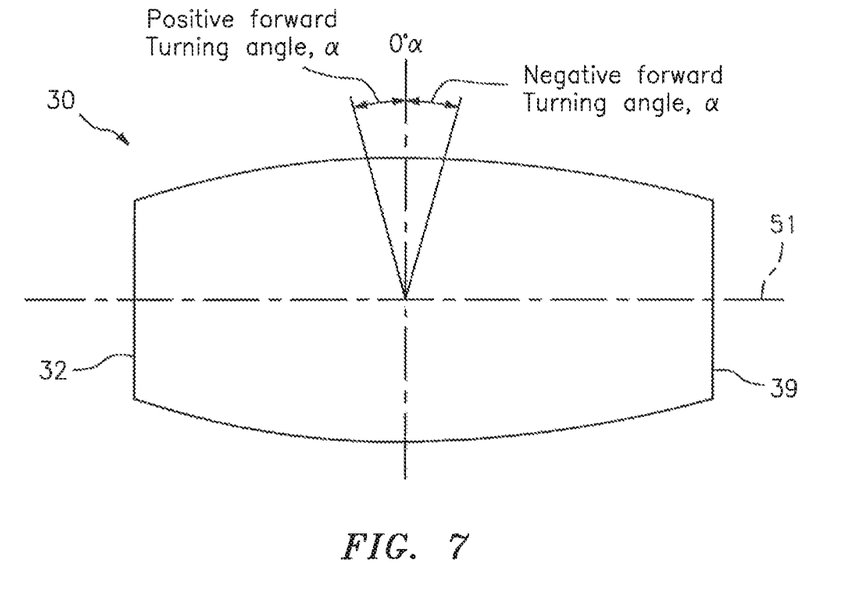
FIG. 7 is a diagrammatic side view of a nacelle embodiment.

Referring to FIGS. 6, 6A, and 7, each forward turning vane 52 is configured to alter the direction of airflow passing through the cascade box 42; e.g., the forward turning vanes 52 are configured to "turn" the direction of the airflow from a first direction entering the inlet side of the cascade box 42 to a second direction exiting the exit side of the cascade box 42. More specifically, each forward turning vane 52 is configured to direct the air in a direction that has a radial component ("RC"). In some instances a forward turning vane 52 may also be configured to direct the air in a direction that has an axial component ("AC"). The amount a forward turning vane 52 redirects or turns the airflow axially relative to the centerline 51 of the nacelle 30 or engine may be referred to as the "forward turning angle" of the vane, which angle may be symbolized as "α" (alpha); e.g., see FIG. 6A. A forward turning vane 52 having a zero degree (0°) forward turning angle will redirect the bypass airflow in a direction substantially perpendicular to the engine centerline; e.g., neither axially forward nor aft. A forward turning vane 52 having a forward turning angle greater than zero (e.g., a "positive forward turning angle"), will redirect the bypass airflow at a forward angle; i.e., in a direction having an axial component directed towards the forward end of the nacelle 30 or engine. A forward turning vane 52 having a forward turning angle less than zero (e.g., a "negative forward turning angle"), will redirect the bypass airflow at an aft angle; i.e., in a direction having an axial component directed toward the aft portion of the nacelle 30. Bypass air directed in a direction having an axial component directed towards the forward end of the nacelle 30 produces reverse thrust, and bypass air directed in a direction having an axial component directed towards the aft end of the nacelle 30 produces forward thrust.

Figure 6B:
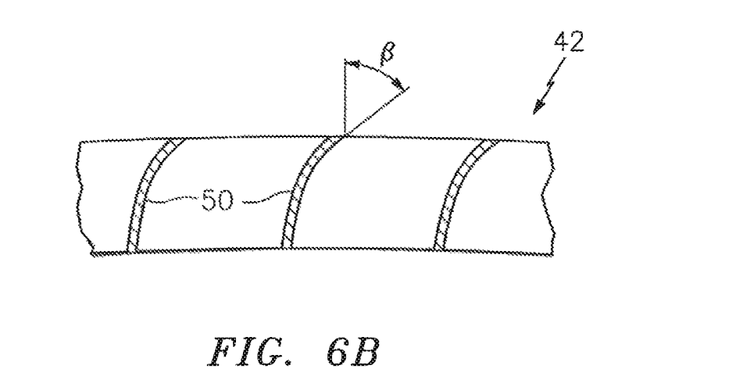
FIG. 6B is a diagrammatic partial widthwise sectional view of a cascade embodiment.
Figure 8:
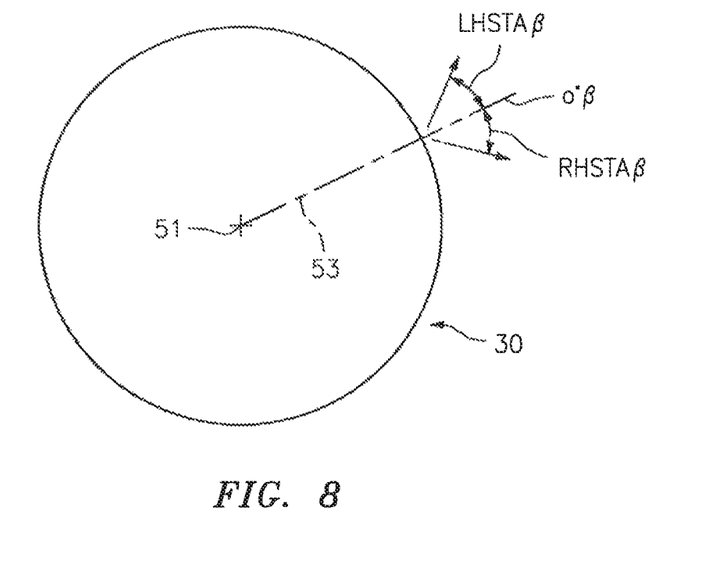
FIG. 8 is a diagrammatic end axial view of a nacelle embodiment.

Referring to FIGS. 6, 6B, and 8, the amount a side turning vane 50 redirects or turns the airflow relative to a radial line extending from the centerline of the engine (i.e., circumferentially) may be referred to as the "side turning angle" of the vane 50, which angle may be symbolized as "β" (beta). A side turning vane 50 having a zero degree (0°) side turning angle will redirect the bypass airflow substantially parallel to a radial line 53 extending out from the centerline of the engine. In some embodiments, a side turning vane 50 may be configured to redirect the air in a direction that is skewed relative to a radial line 53 extending from the centerline 51 of the engine; i.e., in a direction that has both a radial component and a circumferential component. The circumferential component may be described as having a "left-hand" or an opposing "right-hand". A side turning vane 50 that is configured to have a right-hand side turning angle ("RHSTA β") directs bypass air at an angle to the right of a radial line 53 extending from the centerline 51 of the nacelle 30 or engine, and a side turning vane 50 that is configured to have a left-hand side turning angle ("LHSTA β") directs bypass air at an angle to the left of a radial line 53 extending from the centerline 51 of the engine/nacelle. The convention of "left hand" and "right hand" depends upon the perspective taken, and therefore the present disclosure contemplates that the aforesaid left/right convention may be reversed.

Typically, within a particular ladder, all of the forward turning vanes 52 have the same magnitude forward turning angle and side turning vanes 50 (on a respective side of the ladder) have the same magnitude side turning angle configuration. In some embodiments, however, the vanes 50, 52 within a particular ladder of a cascade box 42 may have a configuration that is different from the vanes 50, 52 in other ladders of the same cascade 42; e.g., a first ladder may have vanes 50, 52 with a first configuration, and one or more of the other ladders within the cascade 42 may have a second vane 50, 52 configuration, different from the first vane 50, 52 configuration. The aforesaid different vane 50, 52 configurations may be a different forward turning angle, or a different side turning angle, or both. The specific arrangement of ladders with different vane 50, 52 configurations can vary; e.g., a cascade box 42 having one ladder with a first vane 50, 52 configuration, and the remaining ladders having a second vane 50, 52 configuration (different from the first); a cascade box 42 having a plurality of ladders with a first vane 50, 52 configuration, and the remaining ladders having a second vane 50, 52 configuration (different from the first); a cascade box 42 having ladders, each with a different vane 50, 52 configuration (e.g., progressive changes in vane forward turning angle from ladder to ladder, or progressive changes in vane side turning angle from ladder to ladder, or both, etc.). The present disclosure is not limited to the aforesaid cascade ladder configuration examples.

To illustrate, the exemplary cascade box 42 shown in FIG. 6 includes seven ladders (L1-L7). The forward turning vanes 52 within the ladder contiguous with the first lateral side 43 of the cascade 42 (i.e., L1) may be described as having a forward turning angle "alpha 1" (α1), and the side turning vanes 50 (at least on a respective side of the ladder) may have a side turning angle beta 1 (β1); i.e., (α1, β1). The forward turning vanes 52 within the ladder contiguous with the second lateral side 45 of the cascade box 42 (i.e., L7), may be described as having a forward turning angle "alpha 7" (α7), and the side turning vanes 50 (at least on a respective side of the ladder) may have a side turning angle beta 7 (β7); i.e., (α7, β7). The forward turning angle alpha 1 (α1) is different from the forward turning angle alpha 7 (α7), and the side turning angle beta 1 (β1) is different from the side turning angle beta 7 (β7). Each of the ladders (L2-L6) disposed between the L1 ladder and the L7 ladder may have a vane 50, 52 configuration that is incrementally different; e.g., the forward turning angle alpha, and/or the side turning angle beta of the vanes 50, 52 incrementally changes (e.g., increase or decreases), ladder to ladder, from L1 to L7.

The direction of the air exiting the cascade boxes 42 (e.g., the amount of forward turning angle and/or the amount of side turning angle) is significant for several reasons. For example, as stated above the amount of bypass air exiting the cascade boxes 42 at a positive forward turning angle is a factor in the amount of reverse thrust that is produced by the thrust reverser system 36. The side turning angle (e.g., the circumferential directional component) of the bypass air exiting the cascades 42 is also important relative to the potential for reingestion and the location of the aircraft 20 structure. For example, cascade boxes 42 having side turning vanes 50 can be deployed on the inboard side of the nacelle (i.e., the side of the nacelle proximate the aircraft 20 fuselage) to direct the thrust reverser air away from the fuselage to avoid gas impingement on the fuselage. Cascade boxes 42 having side turning vanes 50 can be also be deployed adjacent bottom dead center ("BDC") of the nacelle to direct the thrust reverser air away from the ground, and thereby mitigate potential reingestion of thrust reverser air and/or foreign object ingestion. Cascade boxes 42 having vanes 50, 52 can also be deployed adjacent BDC of the nacelle to direct the thrust reverser air in a direction that mitigates the potential for reingestion of thrust reverser air into another engine of the aircraft 20 (on the same wing or the opposite wing). Cascade boxes 42 having vanes 50, 52 can be also be deployed adjacent top dead center ("TDC") of the nacelle to direct the thrust reverser air away from the underside of the wing, and thereby avoid gas impingement on the wing and/or an undesirable elevated pressure region under the wing. The present disclosure is not limited to cascades configured in these exemplary embodiments.

In some embodiments of the present disclosure certain of the cascade boxes 42 may be configured such that the forward turning vanes 52 within one or more ladders of the respective cascade box 42 have a negative forward turning angle; i.e., the bypass air exiting the respective cascade box 42 is redirected in a direction having an axial component directed toward the aft portion of the nacelle 30. By redirecting the bypass air at a negative forward turning angle, the cascade box 42 turns the air away from the nacelle inlet 32 and thereby minimizes or avoids the potential for reingestion.

As stated above, the exemplary nacelle cascade box 42 arrangement shown in FIG. 5 reflects a non-limiting example having sixteen cascade boxes 42. There is an upper region that has no cascade box 42. This upper region is positioned at TDC of the nacelle 30, and is typically aligned with the pylon that structurally connects the nacelle 30 to the wing. In this example, there is also a lower region that has no cascade box 42. The lower region is positioned at BDC of the nacelle 30. To facilitate the explanation herein, the cascade boxes 42 are numbered with reference numbers C1-C16, with cascade box C1 disposed at the upper left (adjacent the wing/pylon). Cascade boxes C2-C15 are positioned sequentially around the circumference of the nacelle 30 in a counterclockwise direction.

Figure 9:
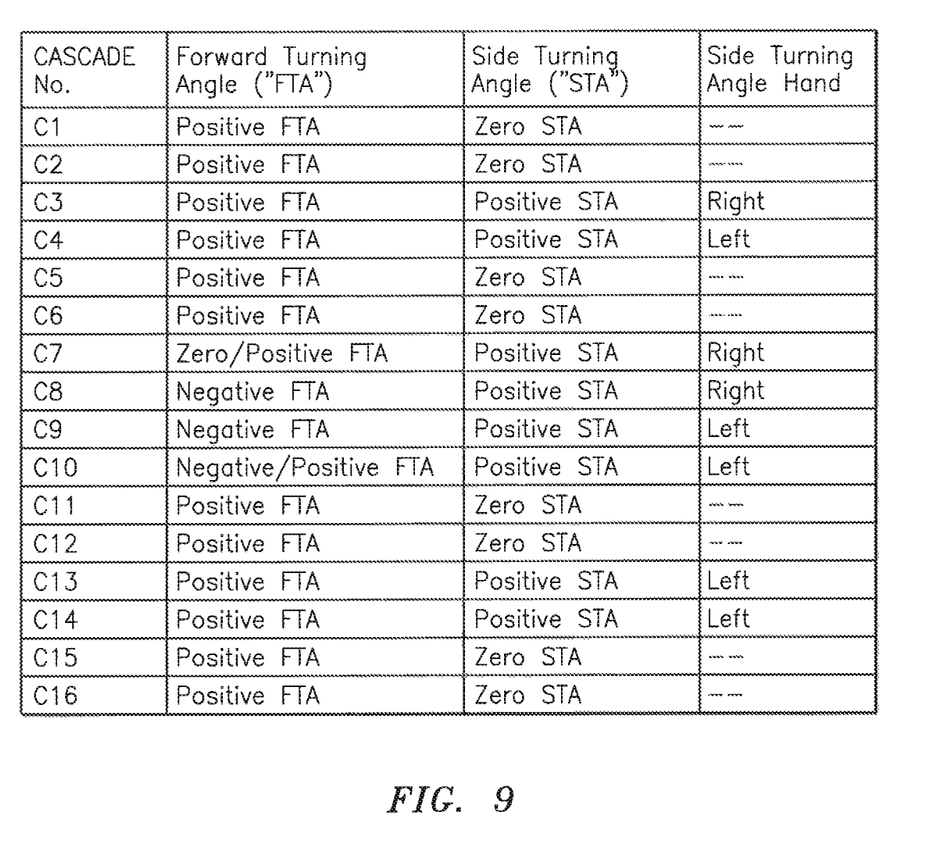
FIG. 9 is a table containing exemplary cascade configurations within a nacelle cascade arrangement.
Figure 10:
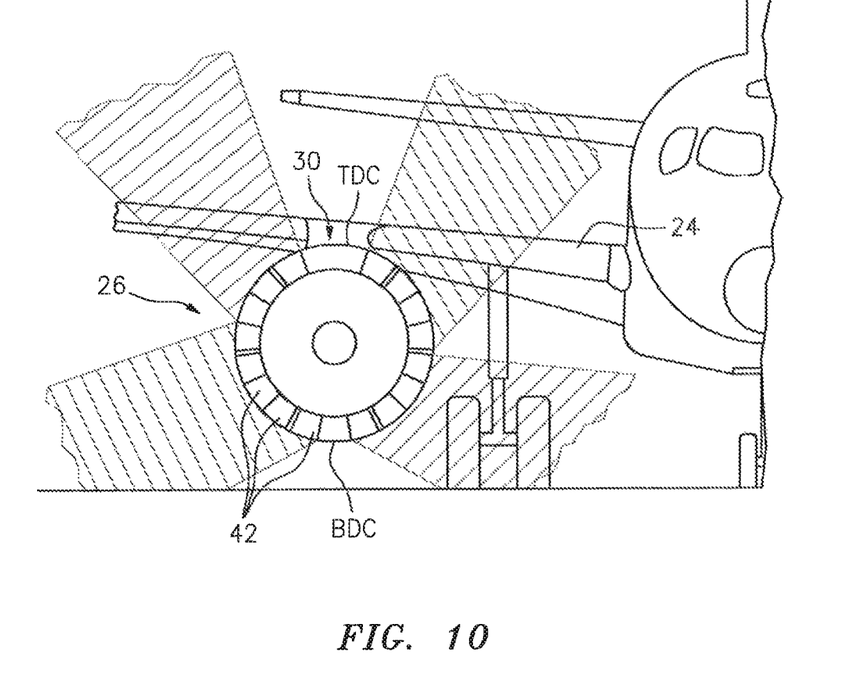
FIG. 10 is a diagrammatic view of thrust reverser system bypass air plumes.

FIG. 9 includes a table describing the non-limiting example of an exemplary nacelle cascade box 42 arrangement shown in FIG. 5; e.g., where cascade boxes 42 having ladders with forward turning vanes 52 having a positive forward turning angle, or forward turning vanes 52 with a negative forward turning angle, or side turning vanes 50 with a zero side turning angle, or side turning vanes 50 with a left or right hand side turning angle, or side turning vanes 50 with a zero side turning angle, and/or combinations thereof, may be implemented. In this non-limiting example, cascade box C7 is indicated as having forward turning vanes 52 having "zero/positive" forward turning angle. This reflects that cascade box C7 has at least one ladder with forward turning vanes 52 having a zero forward turning angle, and at least one ladder with forward turning vanes 52 having a positive forward turning angle. Also in this non-limiting example, cascade box C10 is indicated as having forward turning vanes 52 having a "negative/positive" forward turning angle. This reflects that cascade box C10 has at least one ladder with forward turning vanes 52 having a negative forward turning angle, and at least one ladder with vanes 52 having a positive forward turning angle. Other cascade boxes 42 indicated as having forward turning vanes 52 with a positive forward turning angle may have one or more ladders with vanes 52 at a first positive forward turning angle (e.g., α1) and one or more ladders with vanes 52 at a second positive forward turning angle (e.g., α2, where α1≠α2); i.e., as described above. Cascade boxes 41 indicated as having side turning vanes 50 with a positive side turning angle may have one or more ladders with vanes 50 at a first side turning angle (e.g., β1) and one or more ladders with vanes 50 at a second side turning angle (e.g., β2; where β1≠β2); i.e., as described above. The present disclosure is not limited to cascade boxes 42 with vanes 50, 52 having the identified forward turning angle and/or side turning angle configurations, and is not limited to having cascade boxes 42 with vanes 50, 52 having the identified forward turning angle and/or side turning angle configurations in these particular circumferential positions within the nacelle. The illustration shown in FIG. 10 diagrammatically depicts how the exemplary nacelle cascade box 42 arrangement shown in FIG. 5 may direct bypass air exiting the thrust reverser system 36.

As can be seen from above, nacelle cascade box 42 arrangements according to the present disclosure may be used to: a) direct the thrust reverser air away from the aircraft fuselage to avoid gas impingement on the fuselage; b) direct the thrust reverser air away from the ground, and thereby mitigate potential reingestion of thrust reverser air and/or foreign object ingestion; c) direct thrust reverser air in a direction that mitigates the potential for reingestion of thrust reverser air into another engine of the aircraft 20 (on the same wing or the opposite wing); d) direct thrust reverser air away from the wing, and thereby avoid gas impingement on the wing and/or undesirable pressure applied to the underside of the wing; etc.

Cascade box 42 embodiments according to the present disclosure may significantly decrease the potential for thrust reverser air reingestion. For example, cascade box 42 embodiments according to the present disclosure that include ladders with forward turning vanes 52 having a zero or negative forward turning angle can be implemented in circumferential regions (e.g., C7-C10; proximate BDC) where thrust reverser air bypass air exiting at a positive forward turning angle has a higher probability of reingestion. The utilization of cascade boxes 42 having vane 50, 52 characteristics (e.g., forward turning angle, or side turning angle, or both) that vary from ladder to ladder in particular greatly assist in decreasing the possibility of reingestion.

Cascade box 42 embodiments according to the present disclosure may also significantly improve the effectiveness of a thrust reverser system 36. For example, the utilization of cascade boxes 42 having vane 50, 52 characteristics (e.g., forward turning angle, or side turning angle, or both) that vary from ladder to ladder can increase the amount of reverse thrust produced within the respective cascade box 42 while at the same time present a lower amount of flow impedance than would be present within a prior art cascade box.

Cascade box 42 embodiments according to the present disclosure may also make it possible to lower the thrust reverser system 36 cutoff speed of an aircraft 20. As described above, the potential for thrust reverser air reingestion increases once the aircraft 20 has slowed to a predetermined ground speed. To avoid potentially detrimental reingestion, therefore, aircraft systems will typically disengage a thrust reverser system 36 once the aircraft 20 has slowed to the aforesaid cutoff speed. The utilization of cascade boxes 42 having vane 50, 52 characteristics (e.g., forward turning angle, or side turning angle, or both) that vary from ladder to ladder permits can decrease the potential for thrust reverser air reingestion and increase the amount of reverse thrust produced. As a result, it may be possible to decrease the aircraft cutoff speed, and thereby decrease the burden on the landing gear braking system and/or enable the aircraft 20 to safely decrease the requisite landing distance.

Cascade box 42 embodiments according to the present disclosure may also make it possible to power an aircraft 20 is a reverse direction. The utilization of cascade boxes 42 having forward turning vanes 52 with negative forward turning angles may, in combination with bypass air that is not diverted into the thrust reverser system 36, provide sufficient thrust to enable an aircraft 20 to back up without an external assist (e.g., a push from a tug, etc.).

The present disclosure has been described herein utilizing particular cascade box 42 embodiments for illustration purposes. The present disclosure is not limited to these particular cascade box 42 configurations. For example, the cascade box 42 embodiment shown in FIG. 6 is often referred to generically as an "egg box" style cascade box. Aspects of the present disclosure may be applied to other style cascade boxes (e.g., skew type cascades that utilize a single turning surface within a given portal of the cascade box, etc.). These alternative cascade box styles may include, for example, negative forward turning surfaces or vanes, and/or may include turning surfaces or vanes that are the same within a given ladder, but vary from ladder to ladder; e.g., side turning angle and/or forward turning angle that vary in a manner described for the cascade box shown in FIG. 6 and described herein.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cascade box, comprising:
a plurality of lengthwise extending side turning vanes, each of the plurality of lengthwise extending side turning vanes configured to have a side turning angle; and
a plurality of forward turning vanes extending laterally between and fixedly attached to respective adjacent ones of the plurality of lengthwise extending side turning vanes, wherein each of the plurality of forward turning vanes is configured to have a forward turning angle, and the forward turning angle of at least one of the plurality of forward turning vanes comprises a negative forward turning angle;
wherein the cascade box is arranged to have a plurality of lengthwise columns;
wherein each of the plurality of forward turning vanes in a respective one of the lengthwise columns has the same said forward turning angle as each other of the plurality of forward turning vanes in the respective lengthwise column;
wherein the plurality of lengthwise columns includes a first column with all the plurality of forward turning vanes within the first column configured to have a first forward turning angle, and a second column with all the plurality of forward turning vanes within the second column configured to have a second forward turning angle;
wherein the first forward turning angle is greater than the second forward turning angle;
wherein the first column is lengthwise aligned with and laterally offset from the second column;
wherein the cascade box comprises a first lateral side and a second lateral side coupled to a leading end and a trailing end;
wherein the plurality of lengthwise columns are positioned between the first lateral side and the second lateral side; and
wherein the plurality of lengthwise extending side turning vanes extend from the leading end to the trailing end.

2. The cascade box of claim 1, wherein the first forward turning angle is a positive forward turning angle, and the second forward turning angle comprises the negative forward turning angle.

3. The cascade box of claim 1, wherein the first forward turning angle and the second forward turning angles are both positive forward turning angles.

4. A nacelle, comprising:
a cowl;
a plurality of cascade boxes arranged circumferentially around the nacelle; and
a translating sleeve configured to translate relative to the cowl between a closed position and an open position, the translating sleeve further configured to cover the plurality of cascade boxes in the closed position and to uncover the plurality of cascade boxes in the open position;
wherein each of the plurality of cascade boxes includes a plurality of lengthwise extending side turning vanes, each configured to have a side turning angle, and a plurality of forward turning vanes laterally between and attached to respective adjacent ones of the plurality of lengthwise extending side turning vanes, wherein each of the plurality of forward turning vanes is configured to have a forward turning angle, and the forward turning angle of at least one of the plurality of forward turning vanes is a negative forward turning angle;
wherein each of the plurality of cascade boxes is arranged to have a plurality of lengthwise columns, including a first column with all the plurality of forward turning vanes within the first column configured to have a first forward turning angle, and a second column with all the plurality of forward turning vanes within the second column configured to have a second forward turning angle;
wherein the first forward turning angle is greater than the second forward turning angle;
wherein the first column is laterally displaced from and lengthwise overlaps the second column;
wherein each of the plurality of cascade boxes comprises a first lateral side and a second lateral side coupled to a leading end and a trailing end;
wherein the plurality of lengthwise columns are positioned between the first lateral side and the second lateral side; and
wherein the plurality of lengthwise extending side turning vanes extend from the leading end to the trailing end.

5. The nacelle of claim 4, wherein the first forward turning angle is a positive forward turning angle, and the second forward turning angle is the negative forward turning angle.

6. A cascade box, comprising:
a plurality of lengthwise extending side turning vanes, each of the plurality of lengthwise extending side turning vanes configured to have a side turning angle; and
a plurality of forward turning vanes laterally between and connected to respective adjacent ones of the plurality of lengthwise extending side turning vanes, each of the plurality of forward turning vanes configured to have a forward turning angle;

wherein the cascade box is arranged to have a plurality of lengthwise columns;

wherein each of the plurality of forward turning vanes in a respective one of the lengthwise columns has the same said forward turning angle as each other of the plurality of forward turning vanes in the respective lengthwise column;

wherein the plurality of lengthwise columns includes a first column with all the plurality of forward turning vanes within the first column configured to have a first forward turning angle, and a second column with all the plurality of forward turning vanes within the second column configured to have a second forward turning angle;

wherein the first forward turning angle is different than the second forward turning angle;

wherein the first column lengthwise overlaps and is laterally next to the second column;

wherein the cascade box comprises a first lateral side and a second lateral side coupled to a leading end and a trailing end;

wherein the plurality of lengthwise columns are positioned between the first lateral side and the second lateral side; and wherein the plurality of lengthwise extending side turning vanes extend from the leading end to the trailing end.

7. The cascade box of claim 6, wherein the first forward turning angle comprises a negative forward turning angle.

* * * * *